United States Patent [19]

Okano et al.

[11] Patent Number: 5,021,656

[45] Date of Patent: Jun. 4, 1991

[54] METHOD FOR DISPLAYING AUTORADIOGRAPH

[75] Inventors: Shinichi Okano; Makoto Hara, both of Kaisei, Japan

[73] Assignee: Fuji Photo Film Co., Ltd., Kanagawa, Japan

[21] Appl. No.: 373,613

[22] Filed: Jun. 29, 1989

Related U.S. Application Data

[63] Continuation of Ser. No. 172,975, Mar. 22, 1988, abandoned, which is a continuation of Ser. No. 898,000, Aug. 19, 1986, abandoned.

[30] Foreign Application Priority Data

Aug. 19, 1985 [JP] Japan .................................. 60-181431

[51] Int. Cl.$^5$ ................................................ G01T 1/20
[52] U.S. Cl. ................................ 250/327.2; 250/484.1
[58] Field of Search ...................... 250/327.2, 484.1 B; 364/413.26

[56] References Cited

U.S. PATENT DOCUMENTS

| | | | |
|---|---|---|---|
| 4,389,670 | 6/1983 | Davidson et al. | 250/363 |
| 4,622,467 | 11/1986 | Britten et al. | 250/389 |
| 4,665,312 | 5/1987 | Shiraichi et al. | 250/303 |

Primary Examiner—Jack I. Berman
Assistant Examiner—Richard Hanig
Attorney, Agent, or Firm—Sixbey, Friedman, Leedom & Ferguson, Jr.

[57] ABSTRACT

A method for displaying autoradiograph having information on two-dimensional location of radioactively labeled substances resolved on a support medium, which includes the steps of:
(1) obtaining digital signals corresponding to said autoradiograph and having information on the resolved positions of radioactively labeled substances and radiation intensity at said positions;
(2) subjecting the digital signals to signal processing to obtain at least two-dimensional waveforms for one resolved row, which exhibit position along the resolving direction and signal level; and
(3) displaying multiply the resulting two-dimensional waveforms at regular intervals in a direction perpendicualr to the resolving direction.

12 Claims, 7 Drawing Sheets

METHOD FOR DISPLAYING AUTORADIOGRAPH

This application is a continuation of Ser. No. 07/172,975, filed Mar. 22, 1988, which itself was a continuation of application Ser. No. 898,000 filed Aug. 19, 1986, both now abandoned.

BACKGROUND OF THE INVENTION

1. Field of the Invention

This invention relates to a method for displaying autoradiograph.

2. Description of the Prior Art

Autoradiography has been known as a method for obtaining information on location of radioactively labeled substances which are distributed in at least one-dimensional direction to form rows consisting of plural bands on a support medium.

For instance, the autoradiography comprises steps of: labeling organism-originating biopolymers such as proteins or nucleic acids with a radioactive element; resolving (developing) the radioactively labeled biopolymers, derivatives thereof, cleavage products thereof or synthetic products thereof on a support medium through a resolving process such as gel electrophoresis; placing the support medium and a high-speed X-ray film together in layers for a certain period of time to expose the film; developing said film; obtaining information on location of the radioactively labeled substances from the developed film; and then performing the identification of the polymeric substances, determination of molecular weight thereof or isolation thereof based on the obtained locational information.

Recently, the autoradiography has been effectively used especially for determining the base sequence of nucleic acid such as DNA or RNA. Further, the autoradiography has been used as an essential means in the screening of gene wherein a hybridization method such as southern blotting, northern blotting or western blotting is employed.

Japanese Patent Provisional Publications No. 59(1984)-83057 and No. 60(1985)-10174 and Japanese Patent Application No. 58(1983)-173393 (which correspond to U.S. applications Ser. No. 837,037, now pending as Ser. No. 07/378,509; No. 624,813 now pending under Ser. No. 07/127,605; and No. 651,279 now pending under Ser. No. 07/431,701, respectively) disclose a radiation image recording and reproducing method using a stimulable phosphor sheet in place of a conventional radiography using a radiosensitive material such as an X-ray film. Said method comprises causing a stimulable phosphor in the stimulable phosphor sheet to absorb radiation energy and exciting the stimulable phosphor with an electromagnetic wave (stimulating rays) such as visible light or infrared rays to release the radiation energy from the phosphor sheet as light emission. This method enables exposure time to be greatly shortened and does not suffer chemical fog which is a problem associated with the conventional radiography. Further, this method has an advantage in that the autoradiograph having locational information on the radioactively labeled substances can be obtained in the form of symbols and/or numerals in addition to a visible image, because the autoradiograph can be stored in the phosphor sheet as the radiation energy and read out as stimulated emission in time sequence.

The analysis of the autoradiograph has been, heretofore, made by a person in such a manner that they have detected the distribution of the radioactively labeled substances on the support medium by visually observing an autoradiograph to obtain the locational information (and further informations such as the identification of the biopolymer, the molecular weight thereof and characteristics thereof based on the locational information) on the specific substances labeled radioactively. For instance, the base sequence of DNA is determined by measuring resolved portions (bands) of radioactively labeled base-specific DNA fragments or a mixture thereof with eyes and comparing the resolved portions among resolved rows of the DNA fragments with each other.

Figure 1:
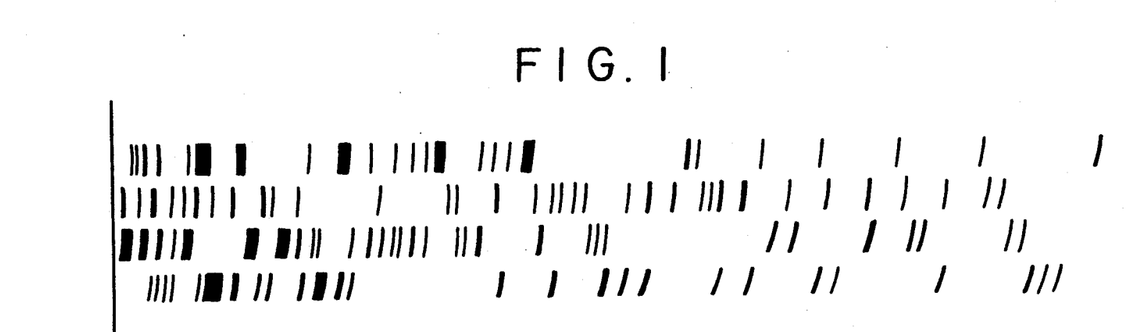
FIG. 1 shows an image obtained by visualizing autoradiograph of an electrophoretic pattern as such on a radiographic film according to the conventional method.

The term "visualized autoradiograph" used herein generally means a radiation image of radioactively labeled substances on a radiographic film, which is obtained by placing a support medium containing the labeled substances resolved (developed) and the radiographic film together in layers to expose the film. For instance, the visible image of autoradiograph is such an image as shown in FIG. 1 (practically, a photographic image having various shade in density is obtained on a film). FIG. 1 shows an example of an electrophoretic pattern in which radioactively labeled DNA fragments are resolved in four rows on a gel support medium through electrophoresis. In FIG. 1, each of black bands represents an electrophoresed portion of DNA fragments. In the above-mentioned radiation image recording and reproducing method, the same autoradiographic image can be obtained on a photographic film by reproducing it from electric signals which are obtained by reading out the stimulable phosphor sheet through an appropriate conversion means. Before the visualization of the autoradiograph, the electric signals can be subjected to various image processing to thereby facilitate the visual analysis of the autoradiographic image.

On the thus-obtained visible image of autoradiograph, however, there are mainly indicated two-dimensional locations of radioactively labeled substances as shown in FIG. 1, and it is almost impossible to accurately determine radiation intensity (namely, amounts of the radioactively labeled substances in proportion thereto) therefrom.

In order to facilitate the analysis of autoradiograph, there has been proposed a method in which electric signals corresponding to the autoradiograph are subjected to image processing such as gradation processing and then the autoradiograph is displayed as an image. However, an extra display device such as graphic display for gradation must be used and cost for analysis is expensive.

To reduce time and labor required for visual analysis and to improve the accuracy of analytical information, there have been previously proposed some methods for automatically obtaining locational information on the radioactively labeled substances in the form of symbols and/or numerals by converting the autoradiograph of the labeled substances distributed in at least one-dimensional direction on a support medium into digital signals and subjecting the digital signals to appropriate signal processing, as disclosed in Japanese Patent Provisional Publications No. 59(1984)-126527 and No. 59(1984)-126278 (which respectively correspond to U.S. application Ser. Nos. 568,877 (now U.S. Pat. No. 4,777,597), and now U.S. Pat. No. 4,777,597 and application Ser. No. 568,875 which is pending), etc. Said digital signals corresponding to the autoradiograph can be obtained by visualizing the autoradiograph on a radiographic film according to the conventional radiography and photoelectrically reading out it by means of reflected light or transmitted light. Alternatively, when a stimulable phosphor sheet is used, said digital signals can be obtained by directly reading out the phosphor sheet on which the autoradiograph is stored and recorded.

Further, there have been proposed methods which comprise electrically displaying an image of original autoradiograph (resolved pattern) on CRT, inputting information required for analysis on the basis of the display image and subjecting digital signals corresponding to the autoradiograph to signal processing according to the input information, namely semi-automatic analytical methods of autoradiograph, as disclosed in Japanese Patent Applications No. 60(1985)-62298 and 60(1985)-62299 (which correspond to U.S. application Ser. No. 844,967 now U.S. Pat. No. 4,837,687).

SUMMARY OF THE INVENTION

An object of the present invention is to provide a method for displaying autoradiograph, which allows the analysis of autoradiograph to be done easily and inexpensively and can provide quantitative information on radioactively labeled substances in the process of obtaining locational information on the labeled substances from the autoradiograph having information on two-dimensional location of the labeled substances resolved on a support medium.

The present invention provides a method for displaying autoradiograph having information on two-dimensional location of radioactively labeled substances resolved on a support medium, which includes the steps of:

(1) obtaining digital signals corresponding to said autoradiograph and having information on the resolved positions of radioactively labeled substances and radiation intensity at said positions;

(2) subjecting the digital signals to signal processing to obtain at least two two-dimensional waveforms for one resolved row, which exhibit position along the resolving direction and signal level; and (3) displaying multiply the resulting two-dimensional waveforms at regular intervals in a direction perpendicular to the resolving direction.

In the present invention, the term "locational information" on the radioactively labeled substances resolved on the support medium means to include a variety of information relating to the location of the labeled substances or the aggregation thereof, being present in the support medium, such as the location, the shape, the concentration, the distribution and combination thereof.

DETAILED DESCRIPTION OF THE INVENTION

In the present invention, the digital signals corresponding to the autoradiograph of radioactively labeled substances are processed in an appropriate circuit having a function of signal processing to obtain the locational information in the form of a plurality of two-dimensional waveforms exhibiting position along the resolving direction and signal level, and the autoradiograph is represented by multiply displaying (hereinafter referred to as "multi-displaying") these two-dimensional waveforms.

According to the present invention, the autoradiograph of the radioactively labeled substances is displayed as a kind of diagram, that is, in the form of a plurality of consecutive two-dimensional waveforms consisting of position along the resolving direction and radiation intensity (that is, amount of radioactive substance) at the position.

Since the autoradiograph is not displayed as such as an image having shade in black and white color, unlike the conventional method, any specific recording material such as radiographic film or photographic film is not required in the present invention. This means that there is not needed any extra output device such as laser printer or graphic display for gradation to display graphically electric signals corresponding to the autoradiograph. In the present invention, an inexpensive general-purpose output device such as dot printer or display usually fixed to personal computer will suffice for the purpose.

When the resulting autoradiograph is directly displayed as an image according to the conventional method, the resolved portions of the radioactively labeled substances are shown merely as black bands and quantitative information can be estimated only from the shades in density of the bands. In the present invention, the quantitative information can be accurately obtained, because said information is represented as peak height (crest) of two-dimensional waveforms. Namely, there can be obtained three-dimensional information consisting of two-dimensional position and radiation intensity at the position. The resolved positions of the labeled substances can be accurately judged from these two-dimensional waveforms.

The three-dimensional information consisting of position in the resolving direction, position in the perpendicular thereto and radiation intensity can be represented in the form of a rectangular coordinate system (x,y,z) by multi-displaying a lot of two-dimensional waveforms at intervals. When the position in the resolving direction is plotted on the abscissa, the relationship of the positions of the labeled substances between different resolved rows can be made clear. When this multi-display is made with further appropriate characters, symbols, dots or straight lines, or is colored, the analysis of the autoradiograph can be made still easier.

Generally, the distribution of a sample composed of a mixture of the radioactively labeled substances is such that the labeled substances are densely in the vicinity of the resolution-starting position and sparsely with an increase in migration distance. For instance, when DNA fragments are resolved through electrophoresis to determine the base sequence of DNA, the smaller the molecular weight thereof is, the farther the fragments are migrated, while those having higher molecular weights are stayed in the vicinity of the electrophoresis-starting position and insufficiently separated. According to the present invention, the radiation intensity, namely the amount of the radioactive substance can be expressed in the diagram and hence, a zone where bands are dense (high-molecular fragment zone) in the vicinity of the electrophoresis-starting position can be easily analyzed.

Further, when two-dimensional waveforms in the high-molecular fragment zone are displayed in the enlarged manner, there can be obtained an effect similar to that obtained in the case where electrophoretic time is practically prolonged or an effect equal to that obtained by gradient gel migration, and hence, the interrelationship between the positions of bands can be easily analyzed and much more information on the base sequence can be read out. That is, the enlargement display or partial display of two-dimensional waveforms can bring about the analytical accuracy substantially equal to that in the case where long-time electrophoresis is made, even when electrophoretic time is shortened.

It is also possible to display the analytical results obtained by subjecting digital signals to signal processing together with the two-dimentional waveforms. In this case, collation and confirmation of analytical results can be facilitated.

Examples of samples employable in the present invention include mixtures of base-specific fragments of nucleic acids such as DNA and RNA labeled with a radioactive element. The term "fragments" of nucleic acids mean portions of a long-chain molecule. For instance, a mixture of base-specific DNA cleavage products, which is a kind of a mixture of base-specific DNA fragments, can be obtained by base-specifically cleaving the radioactively labeled DNA according to the aforementioned MaxamGilbert method. A mixture of base-specific DNA synthetic products can be obtained by synthesizing from radioactively labeled deoxynucleoside triphosphates and DNA polymerase by use of DNA as a template according to the aforementioned Sanger-Coulson method.

Mixtures of base-specific RNA fragments can be also obtained as a mixture of cleavage products or a mixture of synthetic products in the similar manner to the DNA methods. DNA is composed of four kinds of bases: adenine, guanine, thymine and cytosine as its constitutional units, and RNA is composed of four kinds of bases: adenine, guanine, uracil and cytosine. These substances can be labeled with a radioactive element such as $^{32}P$, $^{14}C$, $^{35}S$, $^{3}H$ or $^{125}I$ by any of appropriate methods.

A sample, which is a mixture of the base-specific fragments of a nucleic acid labeled with a radioactive element, can be resolved (developed) on a known support medium such as a gel support medium by any of conventional resolving (developing) procedures such as electrophoresis, thin layer chromatography, column chromatography and paper chromatography.

The support medium on which the radioactively labeled substances are resolved, is autoradiographed by means of the conventional radiography using a radiosensitive material or the radiation image recording and reproducing method using a stimulable phosphor sheet. The digital signals corresponding to the autoradiograph are then obtained through an appropriate read-out system.

When the conventional radiography is used, the support medium and a radiosensitive material such as an X-ray film are placed together in layers at a low temperature of $-90°$ to $-70°$ C. for a long period of time (several tens of hours) to expose the radiographic film. The radiographic film is then developed to visualize the autoradiograph of the radioactively labeled substances on the film, and the visualized autoradiograph is read out by using an image read-out system. For instance, the radiographic film is irradiated with an optical beam and the beam transmitted thereby or reflected therefrom is photoelectrically detected, whereby the visualized autoradiograph can be transformed to electric signals. Further, the electric signals are converted into digital signals corresponding to the autoradiograph through A/D conversion.

When the radiation image recording and reproducing method is used, the support medium and the stimulable phosphor sheet are placed together in layers at an ambient temperature for a short period of time (several seconds to several tens of minutes) to store radiation energy radiating from the radioactively labeled substances in the phosphor sheet, whereby the autoradiograph is recorded as a kind of a latent image (energy-stored image) on the phosphor sheet. The stimulable phosphor sheet, for instance, has a basic structure where a support comprising a plastic film, a phosphor layer comprising a stimulable phosphor such as a divalent europium activated barium fluorobromide phosphor ($BaFBr:Eu^{2+}$) and a transparent protective film are laminated in this order. The stimulable phosphor has characteristics of absorbing and storing radiation energy when irradiated with a radiation such as X-rays and subsequently releasing the stored radiation energy as stimulated emission when excited with visible light to infrared rays.

Then, the autoradiograph stored and recorded on the stimulable phosphor sheet is read out by using a read-out system. For instance, the phosphor sheet is scanned with a laser beam to release the radiation energy stored in the stimulable phosphor as light emission and the emitted light is photoelectrically detected, so that the autoradiograph can be directly obtained as electric signals without the visualization thereof. Further, the electric signals are converted into digital signals corresponding to the autoradiograph through A/D conversion.

The above-described methods for measuring the autoradiograph and obtaining the digital signals corresponding thereto are described in more detail in the aforementioned U.S. patent application Nos. 837,037 and 568,877.

While the methods for obtaining the digital signals corresponding to the autoradiograph using the conventional radiography and the radiation image recording and reproducing method are described above, the present invention is not limited thereto and digital signals obtained by any other methods can be applied to the signal processing method of the invention, provided that they correspond to the autoradiograph.

In the above read-out procedures, it is not always necessary to conduct the read-out operation of the autoradiograph all over the surface of the radiographic film or the stimulable phosphor sheet. Only the image region may be subjected to the read-out operation.

In the present invention, the position of each resolved row and the widths of the bands therein are previously input to preset read-out conditions, the scanning with a light beam in the read-out operation is done at such a scanning line density that each band is traversed by at least two scanning lines, whereby readout time can be shortened and necessary information can be efficiently obtained. Preferably, the scanning line density is five or more scanning lines per one resolved row. In the present invention, digital signals corresponding to the autoradiograph also include the thus obtained digital signals.

The obtained digital signals $D_{xy}$ comprises a coordinate (x,y) which is represented by a coordinate system defined by the radiographic film or the stimulable phosphor sheet and a signal level (z) at the coordinate. The signal level represents radiation intensity at the coordinate, namely the amount of the radioactively labeled substances. Accordingly, a series of the digital signals (that is, digital image data) have information on two-dimensional location of the labeled substances.

Now, an embodiment of a procedure for graphically displaying the thus-obtained digital signals corresponding to the autoradiograph having locational information on the radioactively labeled substances resolved on a support medium will be described by referring to the analysis of autoradiograph for the determination of base sequence of DNA.

A sample is a mixture of radioactively labeled base-specific DNA fragments of the following four groups:
(1) guanine (G)—specific DNA fragments,
(2) adenine (A)—specific DNA fragments,
(3) thymine (T)—specific DNA fragments, and
(4) cytosine (C)—specific DNA fragments,
is resolved (developed) on a gel support medium by electrophoresis. Each group of the above base-specific DNA fragments comprise base-specially cleaved or synthesized DNA fragments having different lengths and having the same base at their terminals.

FIG. 1 shows partially an image obtained by directly visualizing the autoradiograph of an electrophoretic pattern wherein the first to fourth groups of said base-specific DNA fragments are electrophoresed in four slots, respectively, on an X-ray film according to the conventional method.

Digital signals corresponding to the autoradiograph are stored temporarily in a memory device (that is, stored in a non-volatile memory unit such as a buffer memory, a magnetic memory, etc.).

The digital signals are subjected to appropriate signal processing to obtain a plurality of two-dimensional waveforms consisting of position in the electrophoretic direction and signal level.

Figure 2:
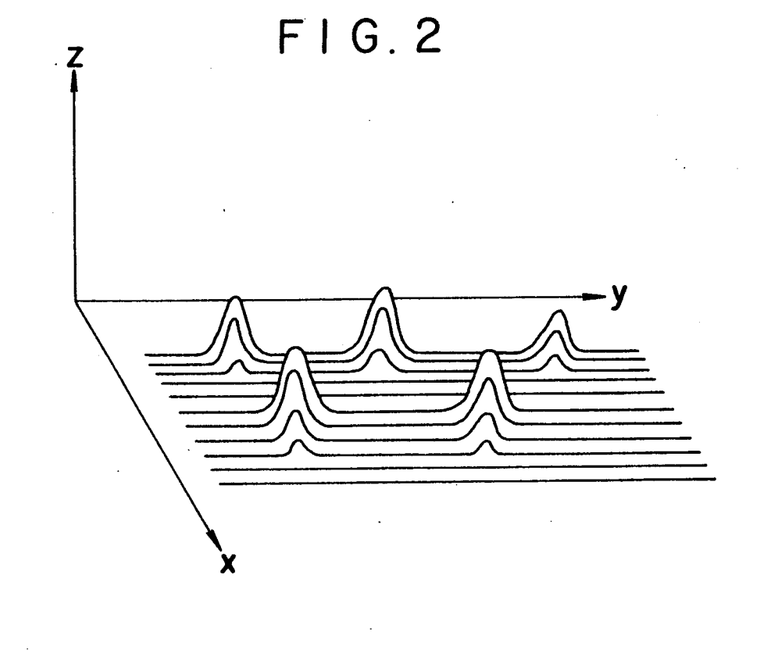
FIG. 2 is a diagram in which two-dimensional waveforms exhibiting position (y) in the electrophoretic direction and signal level (z) are partially represented in a three-dimensional coordinate system composed of position (x) in the direction of slots, position (y) in the electrophoretic direction and signal level (z), according to the method of the present invention.

For instance, the electrophoretic direction is referred to as y direction and the direction of slots is referred to as x direction (see, FIG. 2). Two-dimensional waveform at a given position ($x=x_a$) in the direction of slots is obtained by taking out all signals where x-coordinate is $x_a$ and preparing a graph comprising the position y in the electrophoretic direction and the signal level z. Alternatively, two-dimensional waveform may be prepared from the mean values of signals in a given zone around $x_a$. When the detection of digital signals is carried out by scanning in the electrophoretic direction at such a scanning line density that plural scanning lines traverse each band as described above, two-dimensional waveform can be prepared directly from the obtained digital signals for each scanning line.

At least two two-dimensional waveforms are prepared for every electrophoretic row (lane). From the viewpoint of analytical accuracy, five to ten two-dimensional waveforms per one lane are preferred. When such many waveforms are prepared, peaks on each band can be accurately found and the shape of bands composed of the distributed DNA fragments may be apparent. Namely, this preparation of lots of two-dimensional waveforms in the direction of slots makes possible the graphic display having three-dimensional information comprising the position x in the slot direction, the position y in the electrophoretic direction and the signal level z.

When there is a considerable difference in the amounts of the radioactively labeled substances between the slots, the crest of each two-dimensional waveform is previously adjusted so as to allow the displayed electrophoretic pattern to be easily grasped.

When the electrophoretic pattern causes distortion or noise, the resulting digital signals are subjected to appropriate signal processing to make correction for distortion or to eliminate noise and then said two-dimensional waveforms may be prepared. Such signal processing for the correction of distortion is described, for instance, in the above-mentioned U.S. application No. 844,967.

Then, the resulting two-dimensional waveforms are multi-displayed.

Figure 3:
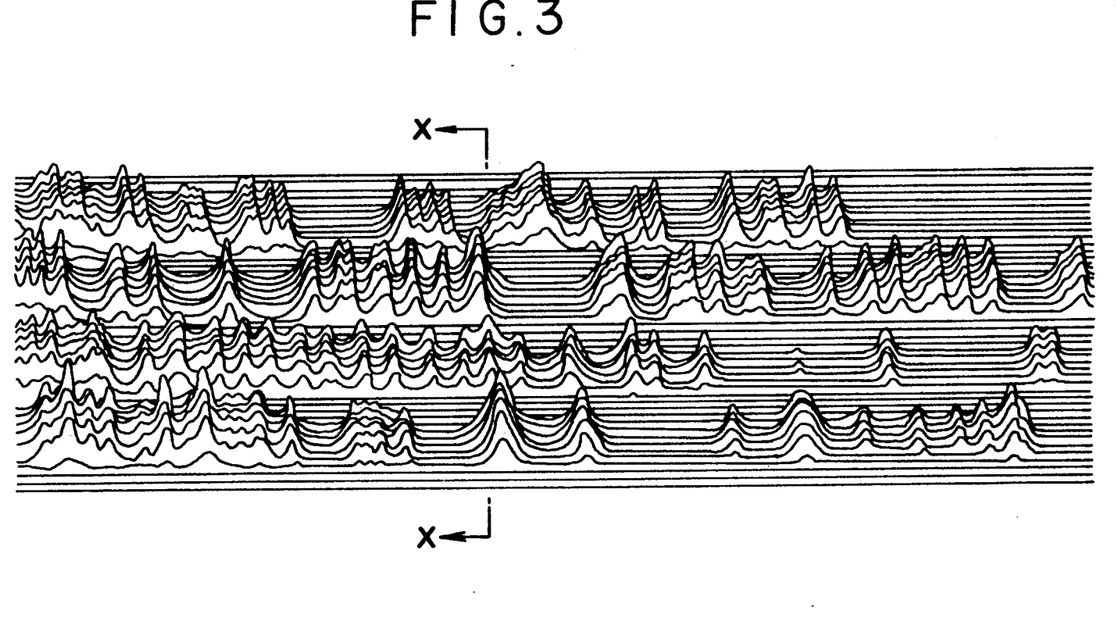
FIG. 3 is a diagram showing an example of multi-displaying two-dimensional waveforms corresponding to autoradiograph at regular intervals in the direction of slots according to the method of the present invention.

For instance, the two-dimensional waveforms exhibiting position y in the electrophoretic direction and signal level z at the position are displayed in the form of being superposed in parallel at regular intervals in the slot direction x as shown in FIG. 3.

FIG. 3 is a diagram showing an example of multi-displaying lots of the two-dimensional waveforms at regular intervals in the slot direction.

A diagram having the same size as that of the conventional autoradiographic image visualized on a radiographic film can be displayed, when the intervals in the slot direction and the position in the electrophoretic direction are made to correspond to x-coordinate and y-coordinate of each two-dimensional waveform. On the contrary, when the intervals in the slot direction and the length and height of two-dimensional waveform are appropriately changed, the diagram can be displayed in a reduced scale which is sometimes preferred. When the space between the lanes is somewhat widened, observation for comparison therebetween can be easily made.

Signals having information on a plurality of these two-dimensional waveforms are outputted from a signal processing circuit and transmitted to a recording device, directly or optionally via storage into a storage means such as a magnetic disk or a magnetic tape.

Various display devices based on various systems can be used for the above described purpose, for instance, electrical devices such as graphic display for non-gradation and CRT, dot printer for graphic, a means for visualizing optically by scanning a photosensitive material with a laser beam, etc. and a means for visualizing on a heat-sensitive recording material using thermic rays.

Figure 4:
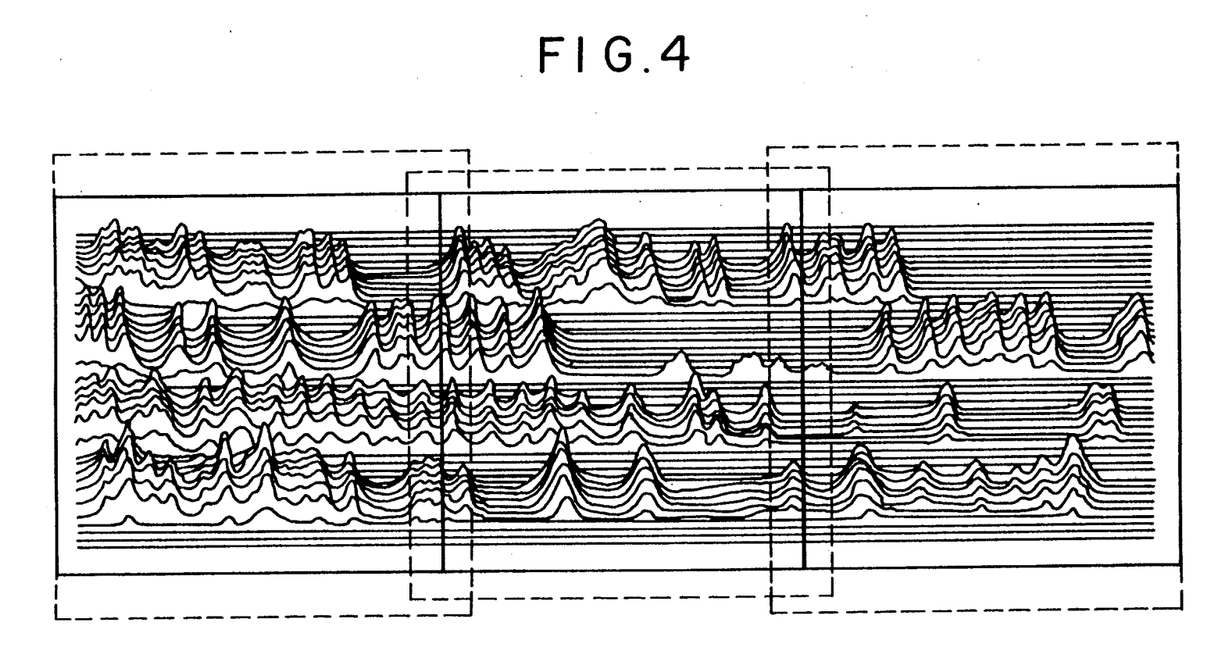
FIG. 4 is a diagram showing an example of displaying electrophoretic pattern in a three-partitioned manner, wherein solid line frames indicate the cases where any partial pattern is not overlapped with each other and dotted line frames indicate the cases where each partial pattern is partially overlapped with the other at both ends.

Now, the display mode of autoradiograph according to the present invention will be described in more detail by referring to various embodiments:

(1) An electrophoretic pattern (diagram) represented by the multi-display of two-dimensional waveforms is displayed in the mode divided into two or more (see, the solid line frames of FIG. 4). The pattern can be displayed in a size allowing easy analysis, even when a display screen is limited in size. Further, since the density of bands in the vicinity of the electrophoresis-starting position is considerably different from that in the electrophoresis-ending part, such division display may be preferred.

(2) In the above (1), each of the divided parts of the pattern is displayed in the manner of overlapping both ends thereof (see, the dotted line frames of FIG. 4). The relationship between the divided parts of the pattern is made clear and the analysis of bands does not cause any trouble.

Figure 5:
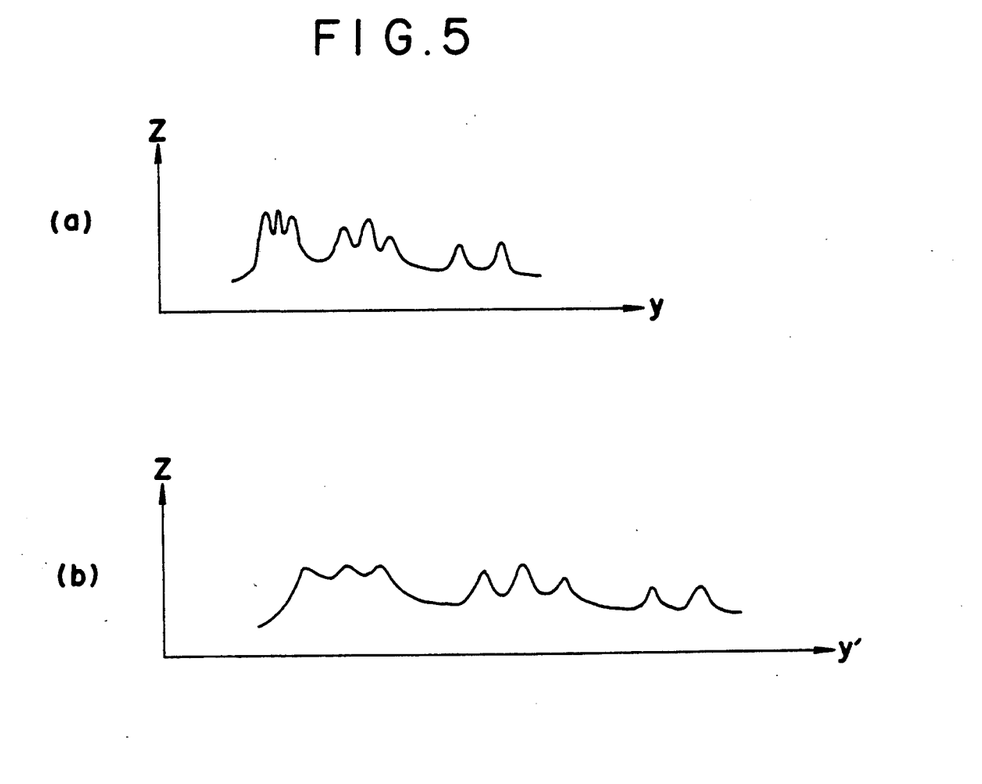
FIG. 5 is a diagram showing an example of displaying a two-dimensional waveform in the manner of gradually enlarging them toward electrophoresis-starting position, wherein (a) shows a basic waveform and (b) shows an enlarged waveform of the basic waveform (a) toward the electrophoresis-starting position.

(3) An electrophoretic pattern is displayed in the mode of enlarging gradually the two-dimensional waveforms toward high-molecular fragment side (toward the electrophoresis-starting position), i.e., enlarging continuously the y-coordinate thereof (see, FIG. 5). Alternatively, the pattern is divided into several sections and the enlargement is made at a different level for each section. Thus, the analysis of the high-molecular fragment zone where bands are dense and which can be hardly analyzed in the conventional method, can be easily made.

(4) An electrophoretic pattern which is reversed with respect to the slot direction and viewed from the opposite side may be also displayed. This reversed pattern can be displayed separately or together with the basic pattern. Thus, there can be distinguished the shape (intensity) on the opposite sides of bands which can be hardly observed owing to the overlapping of two-dimensional waveforms, and the relationship between the positions of bands in the electrophoretic direction can be more understood.

Figure 6:
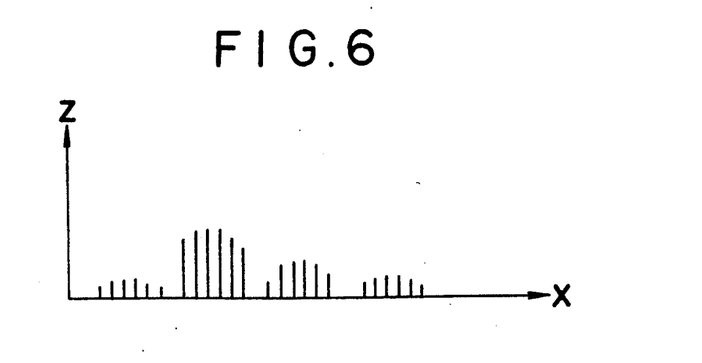
FIG. 6 is a cross-sectional view taken along the line X—X in FIG. 3.

(5) A cross-sectional view in the slot direction at the desired position in the electrophoretic direction may be displayed together (see, FIG. 6). Even when the relationship of band's intensity between the lanes is hardly discriminated, comparison thereof is made easy.

(6) For instance, FIG. 2 is a view of an electrophoretic pattern in the slot direction from just beside, while the pattern may be displayed as a view at a given angle to the slot direction. Thus, the relationship of band's intensity between the lanes may be made easy.

Further, it is possible to make display in various representation modes resulting from the image processing of three-dimensional graphics (computer graphics).

Figure 7:
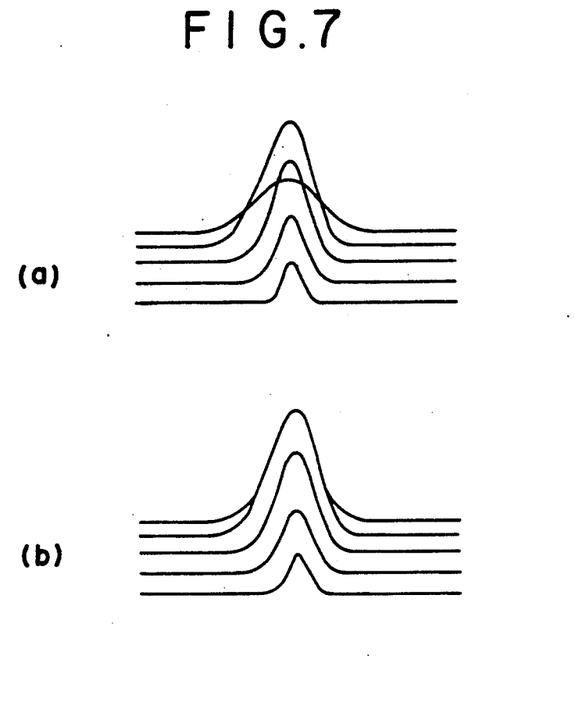
FIG. 7 is a diagram partially showing an example of a two-dimensional waveform which has been subjected to hiding line processing, wherein (a) shows a waveform before processing and (b) shows a waveform after processing.

(7) In the superposing of the two-dimensional waveforms, there is not displayed a part of waveforms on the back side, which is to be hidden by waveforms on the front side (see, FIG. 7). By this hiding line processing, the electrophoretic pattern can be easily grasped.

Figure 8:
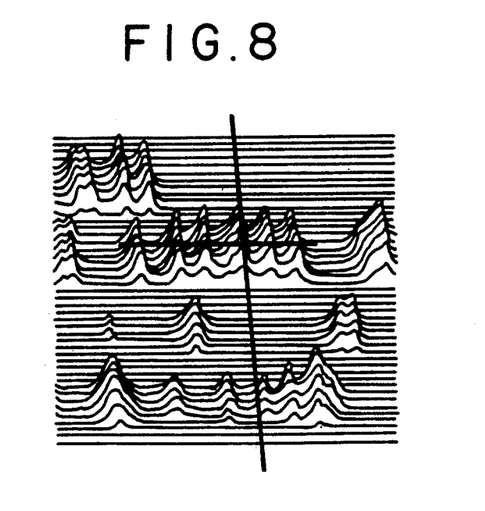
FIG. 8 is a diagram showing an example of displaying two-dimensional waveforms together with scale lines at the positions of lane and band to be analyzed.

(8) A scale line or a suitable mark is displayed together at the position of a band and/or a lane to be analyzed (see, FIG. 8). Thus, the comparison and confirmation of the band and/or the lane to be analyzed can be easily made.

Figure 9:
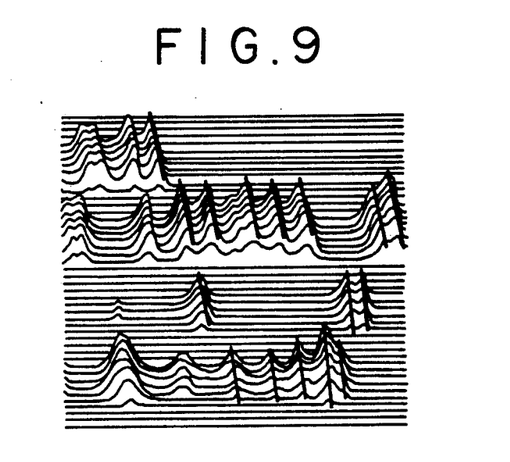
FIG. 9 is a diagram showing an example of displaying two-dimensional waveforms together with top lines at the peaks of bands which have been analyzed.

(9) Top lines or apexes at the peak positions of analyzed bands are displayed together (see, FIG. 9). This peak display may be colored or may be made by a thick line. Thus, the results on the analysis can be easily confirmed.

Figure 10:
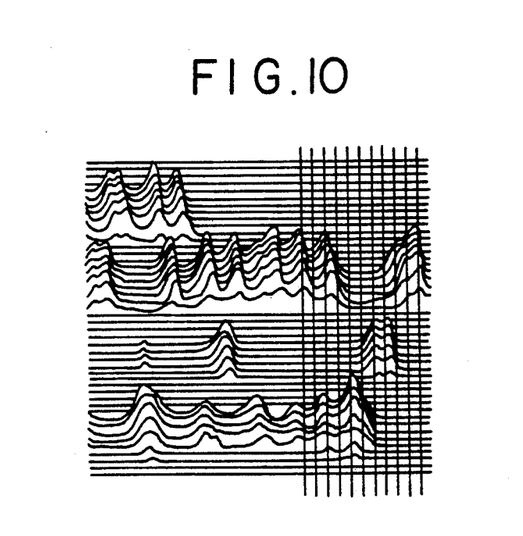
FIG. 10 is a diagram showing an example of displaying two-dimensional waveforms together with scale lines indicating positions in the electrophoretic direction.

(10) Scale lines indicating positions in the electrophoretic direction are displayed over lanes together (see, FIG. 10). The display of scale lines (i.e., equal migration lines) makes the comparison of the bands between the lanes easy.

Figure 11:
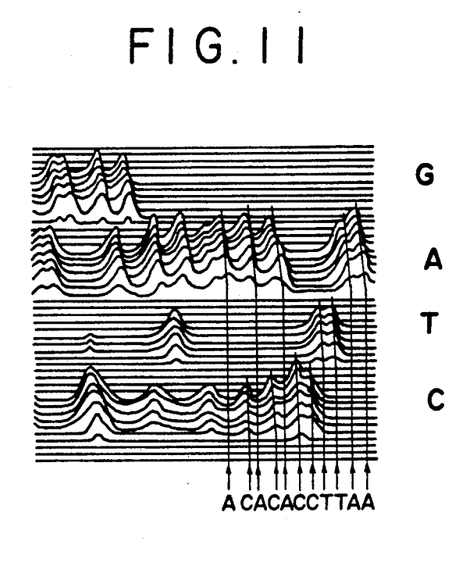
FIG. 11 is a diagram showing an example of displaying two-dimensional waveforms together with analytical results (base sequence of DNA).

(11) Analytical results such as the base sequence of DNA are displayed together (see, FIG. 11). Thus, it is always possible to confirm the analytical results, while observing the electrophoretic pattern.

The above descriptions have been directed to the determination of the base sequence of DNA, but the method for displaying autoradiograph according to the present invention is not limited to the cases where the samples are base-specific DNA fragments. The present invention can be applied to the analysis of the patterns of radioactively labeled substances two-dimensionally resolved on a support medium by various resolution methods. Particularly, the method of the present invention is suitable for use in the microanalysis of proteins and the screening of gene.

We claim:

1. A method for displaying autoradiograph having information on two-dimensional location of bands of radioactively labeled substances in resolved rows on a support medium, which includes the steps of:

(1) placing the support medium and a stimulable phosphor sheet comprising a stimulable phosphor together to form layers to record the autoradiograph on the phosphor sheet as an energy-stored image;

(2) irradiating the phosphor sheet with stimulating rays in the manner that the stimulating rays are scanned to traverse each band to form at least two scanning lines on the bands of each resolved row and photoelectrically detecting the autoradiograph as stimulated emission to obtain digital signals corresponding to said autoradiograph and having information on the positions of bands of radioactively labeled substances and radiation intensity at said positions;

(3) subjecting the digital signals to signal processing to obtain at least two two-dimensional waveforms for one resolved row, which exhibit the positions of the bands along the resolved row and signal levels; and (4) displaying the resulting two-dimensional waveforms in parallel at intervals in a direction perpendicular to the resolved rows, in such manner that a waveform hides a waveform arranged on its back side in the area where two waveforms overlap with each other.

2. The method for displaying autoradiograph as claimed in claim 1, in which said radioactively labeled substances are resolved in two or more rows on the support medium, and two or more two-dimensional waveforms are obtained for each resolved row in said step (3).

3. The method for displaying autoradiograph as claimed in claim 1, in which said two-dimensional waveforms are displayed by enlarging continuously or stepwise them toward the resolution-starting position in said step (4).

4. The method for displaying autoradiograph as claimed in claim 1, in which said two-dimensional waveforms are electrically displayed in said step (4).

5. The method for displaying autoradiograph as claimed in claim 1, in which said two-dimensional waveforms are displayed by printing on a recording material in said step (4).

6. The method for displaying autoradiograph as claimed in claim 1, in which said digital signals are obtained by scanning the autoradiograph with a light beam several times in such a manner that the scanning lines traverse each of resolved portions of the radioactively labeled substances in said step (2), and said two-dimensional waveforms are prepared for the respective scanning lines in said step (3).

7. The method for displaying autoradiograph as claimed in claim 1, in which said radioactively labeled substances are biopolymers, derivatives thereof, cleavage products thereof or synthetic products thereof, labeled with a radioactive element.

8. The method for displaying autoradiograph as claimed in claim 7, in which said biopolymers are nucleic acids, derivatives thereof, cleavage products thereof or synthetic products thereof.

9. The method for displaying autoradiograph as claimed in claim 8, in which said biopolymers are DNA fragments or RNA fragments, and said autoradiograph has information on the base sequence thereof.

10. A method for displaying autoradiograph having information on two-dimensional location of bands of radioactively labeled substances in resolved rows formed on a support medium, which includes the steps of:

(1) placing the support medium and a radiosensitive material together to form layers to record the autoradiograph on the radiosensitive material as a visible image;

(2) photoelectrically reading out the radiosensitive material with a light beam in the manner that the light beam is scanned to traverse each band to form at least two scanning lines on the bands of each resolved row to obtain digital signals corresponding to said autoradiograph and having information on the positions of bands of radioactively labeled substances and radiation intensity at said positions;

(3) subjecting the digital signals to signal processing to obtain at least two two-dimensional waveforms for one resolved row, which exhibit the positions of the bands along the resolved row and signal levels; and (4) displaying the resulting two-dimensional waveforms in parallel at intervals in a direction perpendicular to the resolved rows, in such manner that a waveform hides a waveform arranged on its back side in the area where two waveforms overlap with each other.

11. The method for displaying autoradiograph as claimed in claim 10, in which said radioactively labeled substances are resolved in two or more rows on the support medium, and two or more two-dimensional waveforms are obtained for each resolved two is said step (3).

12. The method for displaying autoradiograph as claimed in claim 10, in which said two-dimensional waveforms are displayed by continuously or stepwise enlarging them toward the resolution-starting position in said step (4).

* * * * *